(12) United States Patent
Morgan

(10) Patent No.: US 10,198,251 B2
(45) Date of Patent: Feb. 5, 2019

(54) PROCESSOR EMULATION USING MULTIPLE TRANSLATIONS

(71) Applicant: Microsoft Technology Licensing, LLC, Redmond, WA (US)

(72) Inventor: Henry Paul Morgan, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/136,863

(22) Filed: Apr. 22, 2016

(65) Prior Publication Data

US 2016/0321049 A1 Nov. 3, 2016

Related U.S. Application Data

(63) Continuation of application No. 14/698,809, filed on Apr. 28, 2015, now Pat. No. 9,335,982.

(51) Int. Cl.
| | |
|---|---|
| *G06F 8/52* | (2018.01) |
| *G06F 8/41* | (2018.01) |
| *G06F 9/455* | (2018.01) |
| *G06F 9/30* | (2018.01) |
| *G06F 8/53* | (2018.01) |

(52) U.S. Cl.
CPC ............... *G06F 8/52* (2013.01); *G06F 8/443* (2013.01); *G06F 8/53* (2013.01); *G06F 9/30174* (2013.01); *G06F 9/4552* (2013.01); *G06F 9/45508* (2013.01)

(58) Field of Classification Search
CPC ... G06F 8/40; G06F 8/443; G06F 8/52; G06F 9/45508; G06F 9/30174
See application file for complete search history.

(56) References Cited

U.S. PATENT DOCUMENTS

| | | | |
|---|---|---|---|
| 5,835,773 A | 11/1998 | Dunn | |
| 5,842,017 A | 11/1998 | Hookway et al. | |
| 5,903,760 A * | 5/1999 | Farber | G06F 8/443 |
| | | | 712/E9.037 |

(Continued)

OTHER PUBLICATIONS

Cristina Cifuentes et al.,"Binary Translation: Static, Dynamic, Retargetable?," 1996, Proceedings of International Conference on Software Maintenance, pp. 340-349, downloaded from the Internet at <url>:https://ieeexplore.ieee.org/stamp/stamp.jsp?tp=& arnumber=565037. (Year: 1996).*

(Continued)

*Primary Examiner* — Thuy Dao
*Assistant Examiner* — Stephen D Berman

(57) ABSTRACT

Examples described herein emulate a processing architecture using multiple translations of the same source binary. A first translation binary includes compiler optimizations not present in a second translation binary. During runtime, a dispatcher directs control flow of a CPU when branch instructions are reached. Specifically, a dispatcher directs a CPU to execute instructions in the first translation binary, and accesses the second translation binary when an instruction is to a target that is not addressable in the first translation binary. The first and second translation binaries enable a target processing architecture to emulate a source processing architecture without just-in-time compilation or other runtime interpretation.

19 Claims, 6 Drawing Sheets

(56) References Cited

U.S. PATENT DOCUMENTS

| | | | |
|---|---|---|---|
| 6,091,897 A * | 7/2000 | Yates | G06F 9/45516 717/138 |
| 6,105,124 A | 8/2000 | Farber et al. | |
| 6,802,056 B1 * | 10/2004 | Chaiken | G06F 8/52 717/136 |
| 6,820,255 B2 | 11/2004 | Babaian et al. | |
| 7,254,806 B1 * | 8/2007 | Yates, Jr. | G06F 9/45554 712/227 |
| 7,516,453 B1 | 4/2009 | Bugnion | |
| 7,594,221 B2 | 9/2009 | Bhushan et al. | |
| 7,861,234 B1 * | 12/2010 | Lobo | G06F 8/52 717/136 |
| 8,355,901 B2 | 1/2013 | Hieda | |
| 8,433,555 B2 | 4/2013 | Sargaison | |
| 8,494,833 B2 | 7/2013 | Mejdrich et al. | |
| 8,768,683 B2 | 7/2014 | Bohizic et al. | |
| 9,569,613 B2 * | 2/2017 | Yamada | G06F 21/54 |
| 2003/0088860 A1 * | 5/2003 | Wang | G06F 8/443 717/153 |
| 2003/0101334 A1 | 5/2003 | Desoli | |
| 2004/0054992 A1 | 3/2004 | Nair et al. | |
| 2005/0149913 A1 * | 7/2005 | Wang | G06F 9/45516 717/136 |
| 2007/0006178 A1 | 1/2007 | Tan | |
| 2008/0172657 A1 * | 7/2008 | Bensal | G06F 8/52 717/136 |
| 2008/0250231 A1 * | 10/2008 | Tagawa | G06F 8/52 712/220 |
| 2009/0094586 A1 * | 4/2009 | Brown | G06F 8/52 717/136 |
| 2009/0164982 A1 * | 6/2009 | Lobo | G06F 8/52 717/138 |
| 2010/0306746 A1 | 12/2010 | Barua et al. | |
| 2011/0016458 A1 | 1/2011 | Beale et al. | |
| 2011/0016459 A1 | 1/2011 | Meyers et al. | |
| 2011/0029761 A1 | 2/2011 | Sung et al. | |
| 2011/0035745 A1 | 2/2011 | Li et al. | |
| 2011/0071816 A1 | 3/2011 | Bohizic et al. | |
| 2012/0296626 A1 | 11/2012 | Bond et al. | |
| 2013/0096908 A1 | 4/2013 | Cook et al. | |
| 2013/0283249 A1 * | 10/2013 | Kanhere | G06F 8/40 717/139 |
| 2013/0311752 A1 | 11/2013 | Brauch et al. | |
| 2014/0089679 A1 * | 3/2014 | Goffmann | G06F 21/125 713/190 |
| 2014/0115588 A1 | 4/2014 | Traut et al. | |
| 2014/0136179 A1 | 5/2014 | Bohizic et al. | |
| 2014/0181970 A1 | 6/2014 | Belov | |
| 2014/0304493 A1 * | 10/2014 | Zhong | G06F 9/30181 712/226 |
| 2015/0278126 A1 | 10/2015 | Maniatis | |
| 2015/0301841 A1 | 10/2015 | Mackintosh et al. | |
| 2016/0179546 A1 * | 6/2016 | Yamada | G06F 21/54 712/240 |
| 2016/0179547 A1 * | 6/2016 | Yamada | G06F 9/3806 712/239 |
| 2017/0039049 A1 * | 2/2017 | Eltsin | G06F 21/53 |

OTHER PUBLICATIONS

Cristina Cifuentes et al., "The design of a resourceable and retargetable binary translator," 1999, Sixth Working Conference on Reverse Engineering, pp. 1-12, downloaded from the Internet at <url>:https://ieeexplore.ieee.org/stamp/stamp.jsp?tp=&arnumber=806967 (Year: 1999).*

Erik Altman et al., "Advances and Future Challenges in Binary Translation and Optimization," 2001, Proceedings of the IEEE, vol. 89, Issue 11, downloaded from the Internet at <url>:https://ieeexplore.ieee.org/stamp/stamp.jsp?tp=&arnumber=964447. (Year: 2001).*

Piumarta, et al., "Optimizing direct threaded code by selective inlining", In Proceedings of the ACM SIGPLAN conference on Programming language design and implementation, vol. 33, May 1, 1998, 10 pages.

"WinUAE 2.4.0 beta 24 RC2", Published on: Mar. 22, 2012, 2 pages, Available at: http://www.emudreams.pl/news,WinUAE_2.4.0_beta_24_RC2,9099.html.

Simonak, et al., "Software Based CPU Emulation", In Proceedings of Acta Electrotechnica et Informatica, vol. 8, No. 4, Retrieved on: Oct. 20, 2014, 10 pages.

Ung et al., "Machine-Adaptable Dynamic Binary Translation", In Proceedings of the ACM SIGPLAN workshop on Dynamic and adaptive compilation and optimization, Jan. 1, 2000, 11 pages.

Hsu et al., "LnQ: Building High Performance Dynamic Binary Translators with Existing Compiler Backends", In Proceedings of International Conference on Parallel Processing, Sep. 13, 2011, 9 pages.

"QEMU Internals", Retrieved at <<http://qemu.weilnetz.de/qemu-tech.html>>, Retrieved on: Dec. 3, 2014, 10 pages.

"Introduction to Bochs", Bochs User Manual, Retrieved at <<http://bochs.sourceforge.net.doc/docbook/user/introduction.html>>, Retrieved on: Dec. 3, 2014, 2 pages.

Jia et al., "OTT: program structure-aware indirect branch optimization via direct-TPC-table in DBT system," 2014, Proceedings of the 11th ACM Conference on Computing Frontiers Article No. 12, pp. 1-10.

Ramsey et al., "A transformational approach to binary translation of delayed branches," 2003, ACM Transactions on Programming Languages and Systems (TOPLAS), vol. 25, Issue 2, pp. 210-224.

Jia et al., "SPIRE: improving dynamic binary translation through SPC-indexed indirect branch redirecting," 2013, Proceedings of the 9th ACM SIGPLAN/SIGOPS international conference on Virtual execution environments, pp. 1-12.

"Second Written Opinion Issued in PCT Application No. PCT/US2016/026082", dated Mar. 21, 2017, 9 Pages.

"Notice of Allowance Issued in U.S. Appl. No. 14/698,809", dated Jan. 12, 2016, 18 Pages.

Chen, et al., "A Static Binary Translator for Efficient Migration of ARM based Applications", In Proceedings of the 6th Workshop on Optimizations for DSP and Embedded Systems, Apr. 6, 2008, 10 Pages.

"International Search Report & Written Opinion Issued in PCT Application No. PCT/US2016/026082", dated Jun. 29, 2016, 16 Pages.

Shen, et al., "An LLVM-Based Hybrid Binary Translation System", In Proceedings of 7th International Symposium on Industrial Embedded Systems, Jun. 20, 2012, 15 Pages.

"International Preliminary Report on Patentability Issued in PCT Application No. PCT/US2016/026082", dated Jun. 16, 2017, 11 Pages.

* cited by examiner

PROCESSOR EMULATION USING MULTIPLE TRANSLATIONS

CROSS-REFERENCE TO RELATED APPLICATIONS

This application is a continuation of U.S. application Ser. No. 14/698,809, filed Apr. 28, 2015, issued as U.S. Pat. No. 9,335,982 on May 10, 2016. The entirety of which is hereby incorporated by reference herein.

BACKGROUND

Processor emulation enables a target processing architecture to execute binary data configured for execution by a source processing architecture. Some existing systems employ just-in-time compilation. These systems rely on generating machine code for the target architecture on the fly. Such systems are slow, may be unsecure, and/or unusable for many emulation environments.

SUMMARY

Examples of the disclosure emulate a processing architecture using multiple translations. A memory area associated with a computing device in a target processing architecture stores a dispatcher table, a first translated binary which includes a first marker table, and a second translated binary which includes a second marker table. The first and second marker tables map instructions from a source binary to corresponding instructions in the first and second translated binary. A processor is programmed to execute a first translated binary. Upon encountering a branch instruction with a target that is addressable in the first translated binary, the processor is programmed to execute the instruction in the first translated binary. Upon encountering a branch instruction in the first translated binary that is to a target not addressable in the first translated binary, the processor is programmed to access the second translated binary. The second translated binary includes one or more marker values corresponding to the target addresses of a second, complete set of instructions in the source binary.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure provide multiple translation binaries from a source binary to enable emulation of a processing architecture without compiling executable machine code at runtime (e.g., without just-in-time compilation). In some examples, a binary assembly language translator generates two translations of an emulated application. A first translation results from an aggressive attempt to decode and deconstruct a source binary. The first translation is thus highly optimized native code in a target processing architecture. Another translation (e.g., a second translation) is conservative, resulting in a one-to-one mapping of all possible machine instructions in the source binary to addressable instructions in the second translation. The second translation includes all of the instructions in the first translation. When executing the translated code on the target processing architecture, if an emulated code address cannot be located in the first translation, the emulation runtime fails over to the second translation.

Aspects of the disclosure further enable reliable emulation of a source processing architecture in cases where high performance is desired, without compromising the security of the target processing architecture. For example, some computing devices (e.g., a non-legacy gaming console) have a strict security model that prohibits the execution of dynamically generated machine code (e.g., just-in-time compilation). In the example of a non-legacy gaming console, this prevents the non-legacy gaming console from compiling and running software designed for legacy gaming consoles. Aspects of the disclosure operate to support backwards compatibility in such computing devices, in some examples.

Some examples provide fast, reliable processor emulation without a just-in-time compiler, or otherwise without compiling any code on-the-fly during runtime. As a result, these examples improve the functioning of the computing device by increased processing speeds, reduced memory consumption, reduced processor loads, improved processor security by allowing the prohibition of dynamically compiled code, improves operating system resource allocation, and improved performances perceived by a user interacting with the computing device.

Figure 1:
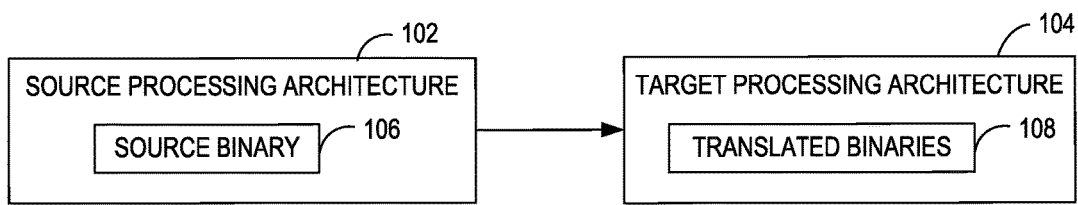
FIG. 1 is an exemplary block diagram illustrating an emulation environment in which a source processing architecture is emulated on a target processing architecture.

Referring next to FIG. 1, an exemplary block diagram illustrates an emulation environment in which a source processing architecture 102 is emulated on a target processing architecture 104. The source processing architecture 102 has access to at least one source binary 106, which has been configured for execution by the source processing architecture 102. For example, the source binary 106 represents data (e.g., instructions) in any format capable of being recognized by the source processing architecture 102 for execution. The target processing architecture 104 has access to one or more translated binaries 108, which have been configured for execution by the target processing architecture 104. The translated binaries 108 correspond to the source binary 106. For example, the translated binaries 108 represent data (e.g., instructions) in any format capable of being recognized by the target processing architecture 104 for execution.

Figure 2:
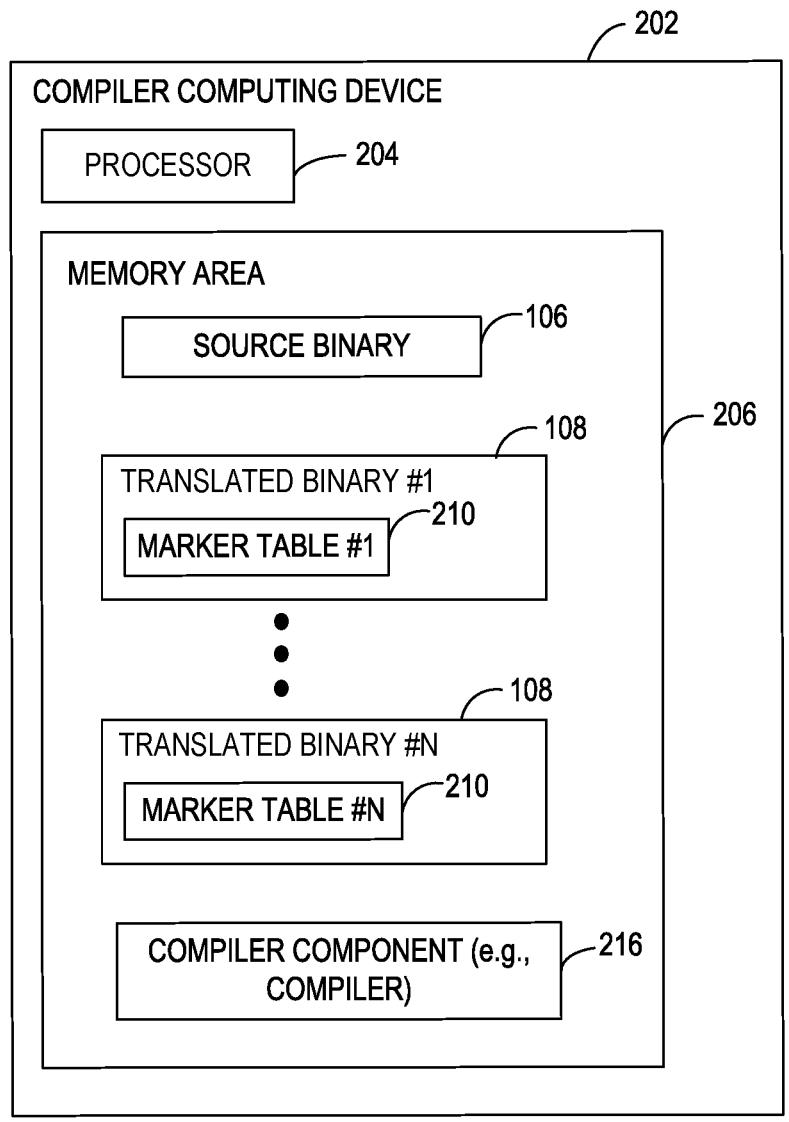
FIG. 2 is an exemplary block diagram illustrating a compiler computing device that executes to produce translated binaries.

Referring next to FIG. 2, an exemplary block diagram illustrates a compiler computing device 202 that executes to produce translated binaries 108. The compiler computing device 202 represents any device executing instructions (e.g., as application programs, operating system functionality, or both) to implement the operations and functionality associated with the compiler computing device 202. The compiler computing device 202 may include a mobile computing device or any other portable device. In some examples, the mobile computing device includes a mobile telephone, laptop, tablet, computing pad, netbook, gaming device, and/or portable media player. The compiler computing device 202 may also include less portable devices such as desktop personal computers, kiosks, tabletop devices, industrial control devices, wireless charging stations, and electric automobile charging stations. Additionally, the compiler computing device 202 may represent a group of processing units or other computing devices.

In some examples, the compiler computing device 202 has at least one processor 204 and a memory area 206. The processor 204 includes any quantity of processing units, and is programmed to execute computer-executable instructions for implementing aspects of the disclosure. The instructions may be performed by the processor 204 or by multiple processors within the compiler computing device 202, or performed by a processor external to the compiler computing device 202. In some examples, the processor 204 is programmed to execute instructions such as those illustrated in the figures (e.g., FIG. 5).

In some examples, the processor 204 represents an implementation of analog techniques to perform the operations described herein. For example, the operations may be performed by an analog computing device and/or a digital computing device.

The compiler computing device 202 further has one or more computer readable media such as the memory area 206. The memory area 206 includes any quantity of media associated with or accessible by the compiler computing device 202. The memory area 206 may be internal to the computing device (as shown in FIG. 2), external to the compiler computing device 202, or both. In some examples, the memory area 206 includes read-only memory and/or memory wired into an analog computing device.

The memory area 206 stores, among other data, one or more applications. The applications, when executed by the processor 204, operate to perform functionality on the compiler computing device 202. Exemplary applications include a disassembler and a compiler (e.g., see FIG. 4). The applications may communicate with counterpart applications or services such as web services accessible via a network. For example, the applications may represent downloaded client-side applications that correspond to server-side services executing in a cloud.

The memory area 206 further stores one or more computer-executable components. An exemplary component includes a compiler component 216. The compiler component 216, when executed by the processor 204 of the compiler computing device 202, causes the processor 204 to generate a first translated binary and a second translated binary from the source binary 106, where the first translated binary, or translated binary #1 108, has one or more compiler optimizations not present in the second translated binary. In some examples, every address from the source binary 106 is translated in the second translated binary 530, or translated binary #2. The first translated binary 520 and the second translated binary 530 are configured to be executed by the target processing architecture 104. The compiler component 216 executes operations, such as those illustrated and described with reference to FIG. 5.

The memory area 206 further stores at least one source binary 106 and one or more translated binaries 108, such as translated binary #1 through translated binary #N. Within each translated binary is a marker table 210, for example marker table #1 through marker table #N. The marker table 210 stores marker values corresponding to the target addresses of the set of instructions in the source binary 106 that are addressable in the selected translated binary. For instance, marker table #1 210 stores the target addresses of the subset of instructions addressable in translated binary #1 108. Marker table #2 stores the target addresses of all of the instructions from the source binary, addressed in translated binary #2 108.

Figure 3:
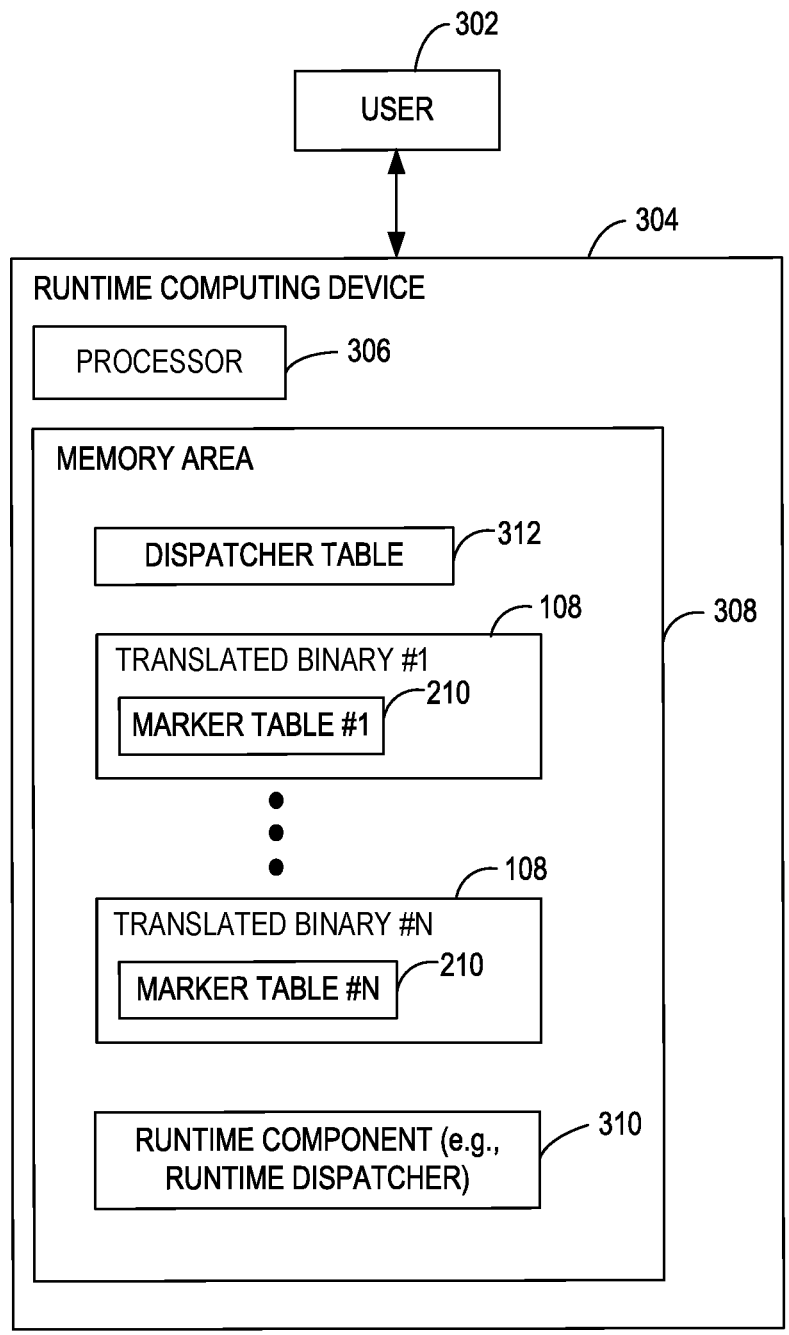
FIG. 3 is an exemplary block diagram illustrating a runtime computing device that executes one or more of the translated binaries from FIG. 2.

Referring next to FIG. 3, an exemplary block diagram illustrates a runtime computing device 304 that executes one or more of the translated binaries 108 from FIG. 2. The runtime computing device 304 represents any device executing instructions (e.g., as application programs, operating system functionality, or both) to implement the operations and functionality associated with the runtime computing device 304. The runtime computing device 304 may include a mobile computing device or any other portable device. In some examples, the mobile computing device includes a mobile telephone, laptop, tablet, computing pad, netbook, gaming device, and/or portable media player. The runtime computing device 304 may also include less portable devices such as desktop personal computers, kiosks, tabletop devices, industrial control devices, wireless charging stations, and electric automobile charging stations. Additionally, the runtime computing device 304 may represent a group of processing units or other computing devices.

In some examples, the runtime computing device 304 has at least one processor 306 and a memory area 308, and at least one user interface. The processor 306 includes any quantity of processing units, and is programmed to execute computer-executable instructions for implementing aspects of the disclosure. The instructions may be performed by the processor 306 or by multiple processors within the runtime computing device 304, or performed by a processor external to the runtime computing device 304. In some examples, the processor 306 is programmed to execute instructions such as those illustrated in the figures (e.g., FIG. 6).

In some examples, the processor 306 represents an implementation of analog techniques to perform the operations described herein. For example, the operations may be performed by an analog computing device and/or a digital computing device.

The runtime computing device 304 further has one or more computer readable media such as the memory area 308. The memory area 308 includes any quantity of media associated with or accessible by the runtime computing device 304. The memory area 308 may be internal to the runtime computing device 304 (as shown in FIG. 3), external to the runtime computing device 304 (not shown), or both (not shown). In some examples, the memory area 308 includes read-only memory and/or memory wired into an analog computing device.

The memory area 308 stores, among other data, one or more applications. The applications, when executed by the processor 306, operate to perform functionality on the runtime computing device 304. Exemplary applications include mail application programs, web browsers, calendar application programs, address book application programs, messaging programs, media applications, location-based services, search programs, and the like. The applications may communicate with counterpart applications or services such as web services accessible via a network. For example, the applications may represent downloaded client-side applications that correspond to server-side services executing in a cloud.

The memory area 308 further stores the dispatcher table 312. The memory area 308 further stores the translated binaries 108, such as translated binary #1 through translated binary #N 108. Within each translated binary is a marker table 210 (e.g., generated by the compiler computing device 202), for example marker table #1 210 within translated binary #1 108 through marker table #N 210 within translated binary #N 108.

The memory area 308 further stores one or more computer-executable components. An exemplary component includes a runtime component 310 (e.g., a runtime dispatcher). The runtime component 310, when executed by the processor 306 of the runtime computing device 304, causes the processor 306 to execute the first translated binary and the second translated binary to emulate the source binary 106 on the target processing architecture 104 by accessing the second translated binary only upon encountering a branch instruction with a target that is not addressable in the first translated binary 520. In some examples, a target is not addressable when the target in the source binary 106 is not linked to a target in a translated binary. The runtime component 310 executes operations, such as those illustrated and described with reference to FIG. 6.

The runtime computing device 304 may also include a communications interface, such as a network interface card and/or computer-executable instructions (e.g., a driver) for operating the network interface card. Communication between the computing device and other devices may occur using any protocol or mechanism over any wired or wireless connection. In some examples, the communications interface is operable with short-range communication technologies such as by using near-field communication (NFC) tags.

The runtime computing device 304 may also include a user interface, such as a graphics card for displaying data to a user 302 and receiving data from the user 302. The user interface may also include computer-executable instructions (e.g., a driver) for operating the graphics card. Further, the user interface may include a display (e.g., a touch screen display or natural user interface) and/or computer-executable instructions (e.g., a driver) for operating the display. The user interface may also include one or more of the following to provide data to the user 302 or receive data from the user 302: speakers, a sound card, a camera, a microphone, a vibration motor, one or more accelerometers, a BLUETOOTH brand communication module, global positioning system (GPS) hardware, and a photoreceptive light sensor. For example, the user 302 may input commands or manipulate data by moving the runtime computing device 304 in a particular way.

In some examples, the compiler computing device 202 and the runtime computing device 304 are the same device, or group of devices.

Figure 4:
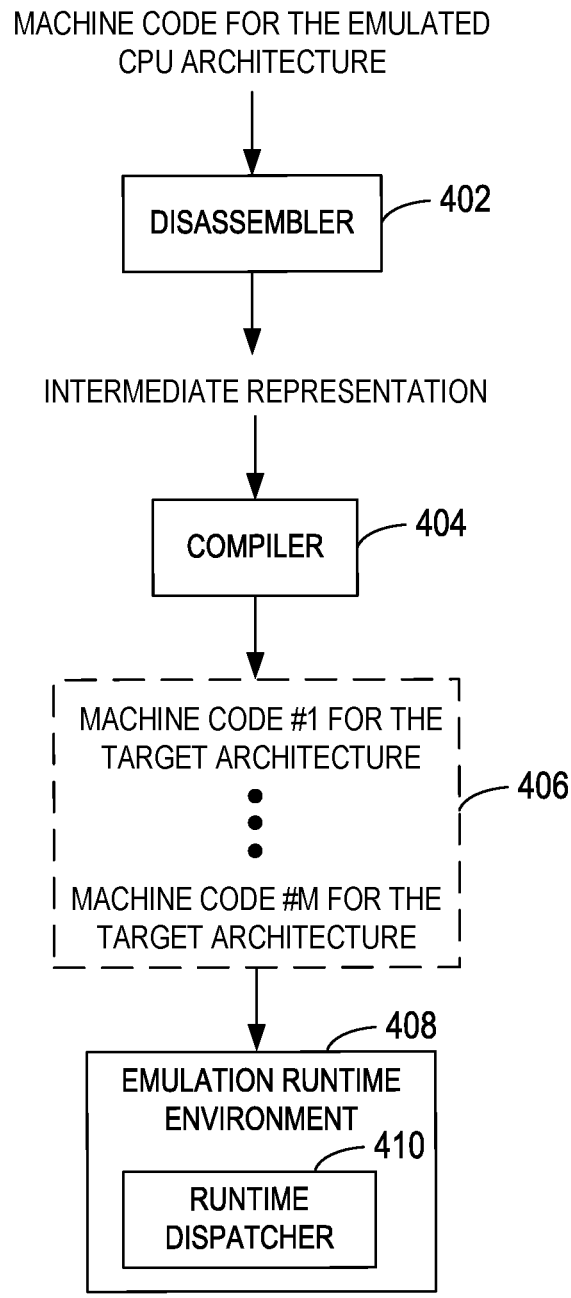
FIG. 4 is an exemplary block diagram illustrating an end-to-end workflow to implement the emulation illustrated in FIG. 1.

Referring next to FIG. 4, an exemplary block diagram illustrates an end-to-end workflow to implement the emulation illustrated in FIG. 1. A disassembler 402 takes (e.g., deconstructs) machine code (e.g., the source binary 106) for the emulated central processing unit (CPU) architecture (e.g., the source processing architecture 102) and produces an intermediate representation (IR).

A compiler 404 (e.g., compiler component 216) take the IR and produces (e.g., generates) a set of machine code 406 (e.g., translated binaries) for the target architecture (e.g., target processing architecture 104), such as machine code #1 through machine code #M. The translated binaries are then used by an emulation runtime environment 408 (e.g., target processing architecture 104) to emulate execution of the source binary 106. In some examples, the emulation runtime environment (408) loads and executes translated binaries via a runtime dispatcher 410.

Figure 5:
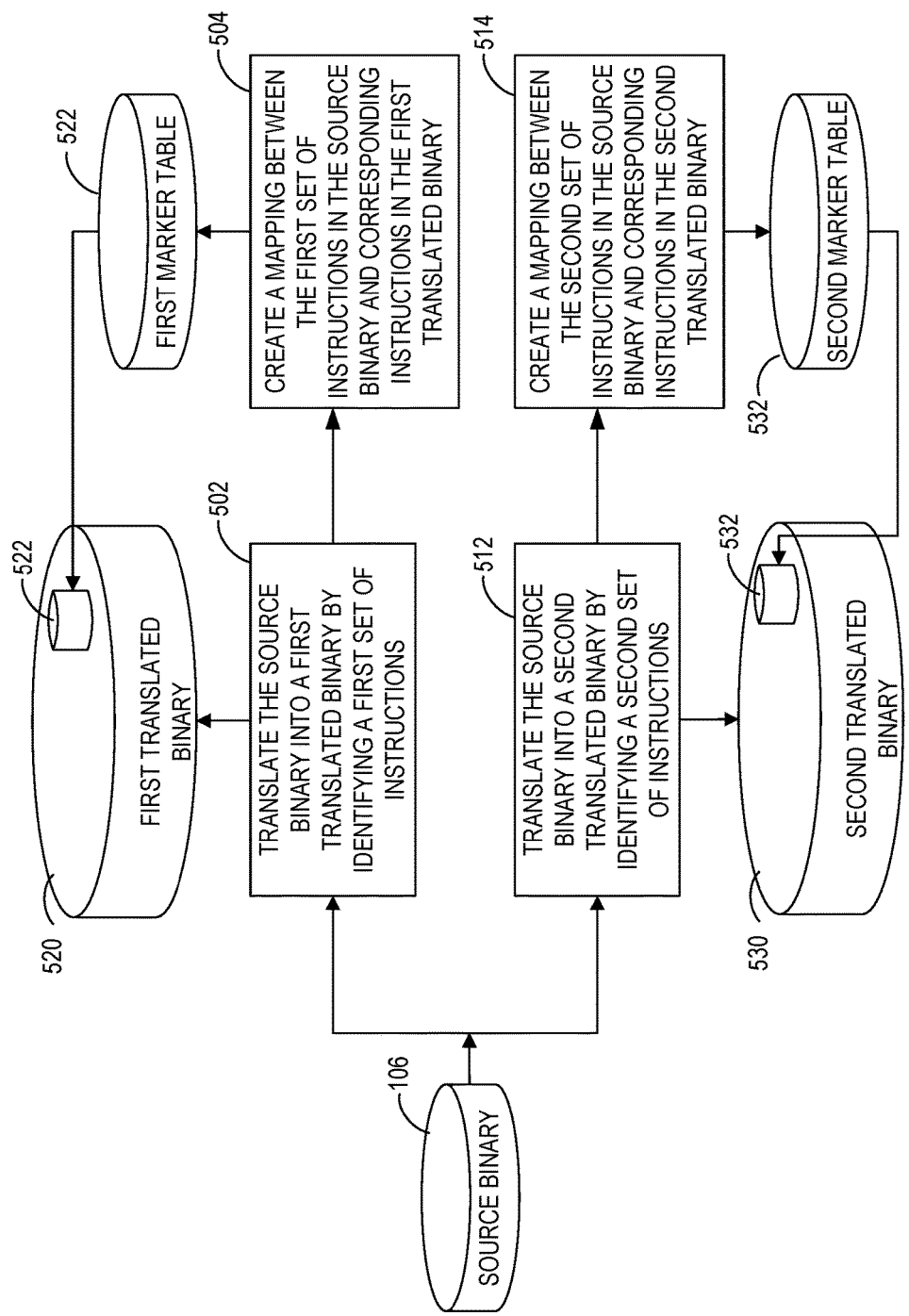
FIG. 5 is an exemplary flowchart illustrating operations performed by the compiler computing device to create the translated binaries.

Referring next to FIG. 5, an exemplary flowchart illustrates operations performed by the compiler computing device 202 to create translated binaries. However, the operations may be performed by other computing devices.

The compiler computing device 202 accesses the source binary 106, and translates the source binary 106 into a first translated binary 520 at 506. The first translated binary 520 has one or more optimizations. The first translated binary 520 has mappings for target addresses that are known to be the target of any external branch instruction, whether indirect or direct. In some examples, an external branch instruction is one that leaves the function. All possible targets of branch instructions are assigned markers and mapped by the compiler computing device 202. However, possible targets of indirect branch instructions are only mapped at runtime, if it determined that the indirect branch instructions leave the function.

Translating includes identifying a subset of instructions in the source binary 106. For example, translating includes recognizing the sub set of instructions in the source binary 106 and including corresponding target architecture versions of the recognized subset of instructions in the first translated binary 520. In some examples, since the first translated binary 520 is the most optimized translation of the source binary 108, the subset of instruction does not include all of the instructions from the source binary 106.

In parallel to 502, the compiler computing device 202 is simultaneously accessing the source binary 106, and translating the entirety of the source binary 106 into a second translated binary 530 at 512. The second translated binary 530 is not optimized, but is a 1 to 1 translation of every instruction in the source binary 106. The second translated binary 530 includes translations of all of the instructions in the subset of the first translated binary 520. In some examples, the second and first translated binaries are created simultaneously. In other examples they are created sequentially.

Indirect branch instructions in the first translated binary 520 are analyzed at compile time. If the indirect branch instructions leave the function, their possible targets are mapped to the first marker table 210. However, an indirect branch instruction may have a target address that is difficult or impossible to determine at compile time. Aspects of the disclosure contemplate a mapping table that represents a dynamic mapping between possible branch target addresses in the source architecture to valid code addresses in the target architecture, for use during emulation runtime. For example, at 504, the compiler computing device 202 creates the mapping between the subset of instructions in the source binary 106 and corresponding instructions in the first translated binary 520. Any possible target of a branch instruction, in the first translated binary 520, that leaves a function has a marker value. In this example, the mapping table is utilized to dynamically map possible branch target addresses in the source architecture to valid code addresses in the target architecture. In some examples, a mapping of the possible targets of instructions in the first translated binary 520 is stored in the first marker table 210. The mapping includes markers for possible targets of branch instructions in the subset of instructions in the first translated binary 520. As described below, at emulation runtime, the dispatcher table 312 is populated with values from the first marker table 522 of the first translated binary 520.

At 514, the compiler computing device 202 creates a mapping table between the instructions in the source binary and the corresponding translations in the second translated binary 530. In some examples, the mapping is stored as the second marker table 532. In some examples, populating the table of the marker values includes creating a lookup table, such as by adding a target address of each translated instruction into the lookup table, where the lookup table is keyed by a corresponding offset in the source binary 106. The marker values correspond to every single instruction in the source binary 106, to enable the runtime computing device 304 to lookup those addresses when a branch instruction is reached in the first translated binary 522. As such, the marker table 210 includes the target address of every single translated instruction in the instruction register (IR), thus making the second translated binary 530 an unoptimized, but complete and conservative translation.

Populating the first marker table 522 and the second marker table 532 may occur simultaneously, or it may occur sequentially. However, the marker tables are not populated until after the first and second translated binaries are created.

In some examples, the compiler computing device 202 supports branching directly to the dispatcher for every branch instruction, direct or indirect, that leaves the current function in the second translated binary 530, to enable returning to the first translated binary 520.

The dispatcher table 312 is, for example, a hash table. Given a guest address, the compiler computing device 202 populates the hash table. For example, the compiler computing device 202 may mask off one bit, shift left once, and then index the result into an array in the hash table (e.g., which is a large array of addresses). The result (e.g., a value at the index) is then the destination for the jump instruction at runtime. This enables static jumps at runtime via a fast lookup, and only fails over to the second translated binary 530 upon encountering a branch instruction to a target that is not addressable in the first translated binary.

In general, the operations illustrated in FIG. 5 operate to translate the source binary 106 into an optimized dynamic link library (DLL) (e.g., fill in as many addresses as feasible) and create a hash table. Further, the operations take that same source binary 106 and examine the gaps between the code found in the binary during the first pass, and translate anything that can be successfully decoded as an instruction in the source architecture. A second binary is generated, inserting a marker corresponding to every single code address that was found in the source binary 106. As a result, there is then a corresponding marker in the target machine code (e.g., machine code 406) for every single valid code address in the source binary 106.

The first translated binary 520 and the second translated binary 530 may be created in series or in parallel by the compiler computing device 202. At runtime (e.g., see FIG. 6), the runtime computing device 304 executes the first translated binary 520 and the second translated binary 530 to emulate the source binary 106.

Figure 6:
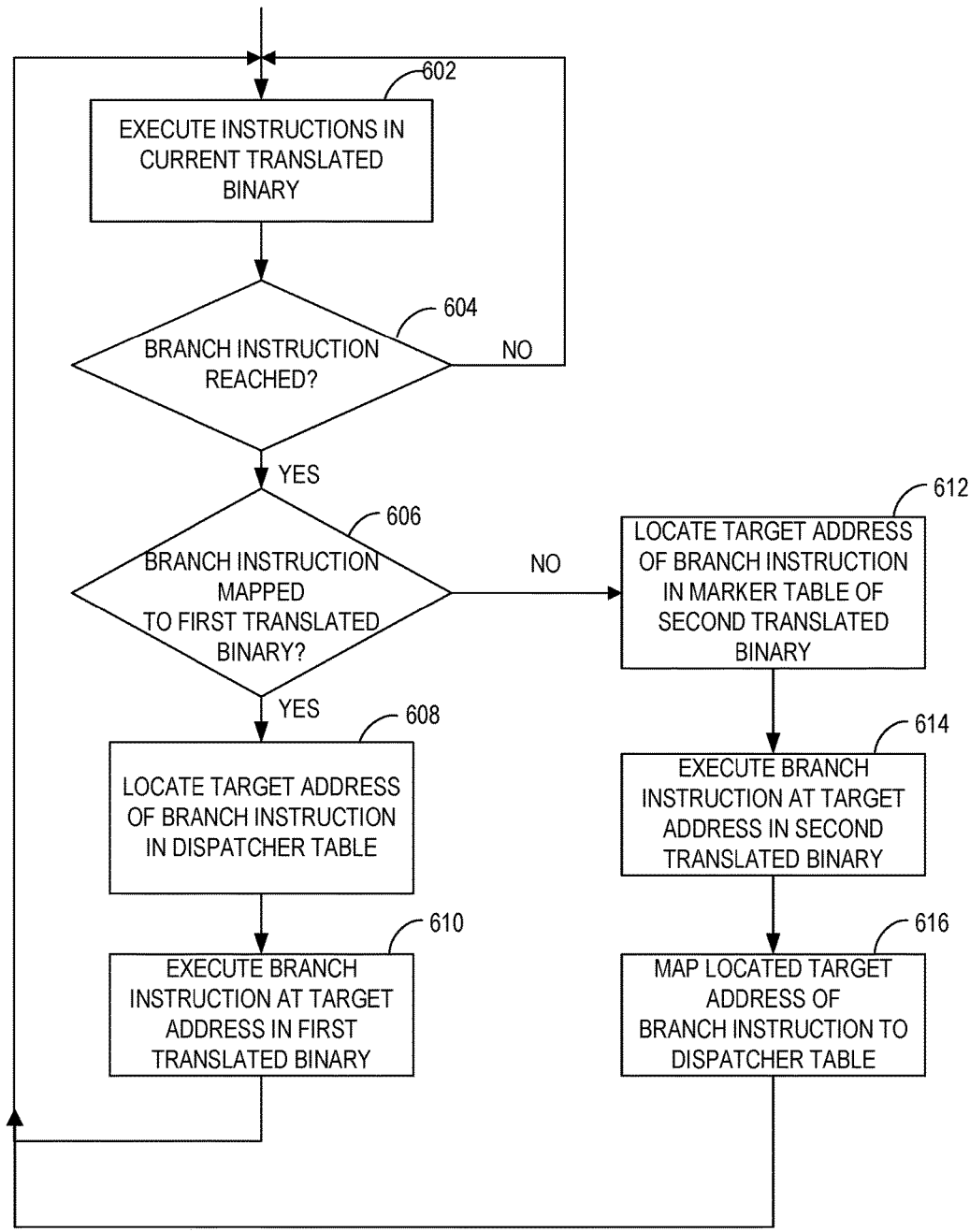
FIG. 6 is an exemplary flowchart illustrating operations performed by the runtime computing device to execute the translated binaries created by the compiler computing device.

Referring next to FIG. 6, an exemplary flowchart illustrates operations performed by the runtime computing device 304 to execute the translated binaries created by the compiler computing device 202. However, the operations may be performed by other computing devices.

At 602, the runtime computing device 304 executes instructions in the current translated binary. When runtime begins, the current translated binary is the first translated binary 520. In one example, a dispatcher executes the instructions on the runtime computing device 304 via the dispatcher table 312. At 604, a branch instruction in the current translated binary 520 is reached. If no branch instruction is reached, the runtime computing device 304 continues to execute instructions in the current translated binary at 602.

If the branch instruction is an indirect branch instruction and its target address is not addressable in the first translated binary 520 at 606, the runtime computing device 304 locates the target address of the branch instruction in the dispatcher table 312 at 608. The runtime computing device 304 then executes the located instruction in the translated binary 610 indicated by the dispatcher table. In some examples, the current translated binary in which the runtime computing device 304 is executing will be the second translated binary 530 when the branch instruction is reached. In that example, if the runtime computing device 304 locates the branch instruction in the first translated binary 520 while executing in the second translated binary 530, the runtime computing device will switch to execution in the first translated binary 520. If any branch leaves the current function, whether it is an indirect or a direct branch instruction, it is translated into an indirect branch instruction to go the dispatcher 310 and potentially leave the second translated binary 530. This ensures that the runtime computing device 304 spends as much time as possible operating out of the first translated binary 520.

If the branch instruction is indirect and its target address is not addressable in the first translated binary 520 at 606, the runtime computing device 304 accesses the marker values of the second translated binary 530 at 612. The marker values are stored, in some examples, in the second marker table 532. The marker values are, in some examples, target addresses of the branch instructions. The runtime computing device 304 executes the branch instruction in the second translated binary 530 via the marker values at 614.

At 616, the runtime computing device 304 updates the dispatcher table 312 based on the marker value so that the instruction will be addressable from the dispatcher table 312. After either updating the dispatcher table 312 at 616 or executing the branch instruction in the first translated binary 520 at 610, the runtime computing device 304 selects another instruction. If the runtime computing device 304 is operating in the second translated binary 530, then the next external branch instruction (e.g., a branch instruction which leaves the current function), direct or indirect, which is addressable in the first translated binary 520 may return the runtime computing device 304 to the first translated binary 520. However, it is not guaranteed that the next external branch instruction will return the runtime computing device 304 to the first translated binary 520, as the next external branch may be an indirect branch instruction with a target that is not addressable in the first translated binary 520. In that example, the runtime computing device 304 will continue to operate in the second translated binary 530.

The runtime computing device 304, in some examples, remains in the current translated binary (first or second) until an indirect branch instruction is reached. At that point, it may change translated binaries, depending on the target address of the indirect branch instruction is located. If any branch leaves the current function, whether it is an indirect or a direct branch instruction, it is translated into an indirect branch instruction to go the dispatcher 310 and potentially leave the second translated binary 530. This ensures that the runtime computing device 304 spends as much time as possible operating out of the first translated binary 520.

Because the dispatcher table 312 is being updated during runtime, eventually every possible target of an indirect branch instruction will become addressable via the dispatcher table 312. From then on, execution flows directly through the dispatcher table 312 at all times, and there is no need to take the failover path to search the marker table 210 in the second translated binary 530.

In this manner, the runtime computing device 304 executes instructions without generating machine code at runtime (e.g., without just-in-time compilation), by going back and forth between the first translated binary 520 and the second translated binary 530. The trigger for accessing the second translated binary 530 is when an indirect branch instruction is encountered that cannot be resolved via the first translated binary 520.

In an example scenario, the second translated binary 530 represents a failover path for the dispatcher in the emulation runtime. Initially at runtime, the dispatcher table 312 is populated with target addresses only from marker table 210 of the first translated binary 520. If a lookup of the target address of an indirect branch instruction fails, the dispatcher attempts to load the second translated binary 530, find the guest address in the marker table 210, and add the corresponding host address into the dispatcher table 312 at the appropriate offset. The attempt to lookup the program counter is then repeated and the emulated program resumes execution.

If a particular code address cannot be resolved by the dispatcher 310 because there is no corresponding entry in the dispatcher table 312, the dispatcher 310 accesses the second translated binary 530 to look for that address in the second marker table 532 built during compilation. If that address is found in the table of markers, the result is put into the dispatcher table 312 at the right location and then execution continues on the second translated binary 530.

In another example scenario, the dispatcher checks an instruction address register (IAR) or other program counter. The IAR contains a value that identifies the current guest instruction being executed. When branching to a new function, the function to be executed is in the IAR. The value from the IAR is looked up in the marker table 210, and the result from the marker table 210 is placed into the dispatcher table 312. The IAR is then the key into the dispatcher table 312. The address in the second translated binary 530 is the value in the dispatcher table 312, execution continues.

Additional Examples

In some examples, the first and second translated binaries are shipped with a game. For example, those binaries are on the game disc, or part of the game download. In this manner, a complete version of the original game has been translated and included as a translated version of the game.

Some scenarios contemplate multiple second translation binaries. For example, each second translation binary may be progressively more conservative (e.g., progressively fewer compiler optimizations). In operation, if an indirect branch instruction is to a target which is not addressable in the first translation binary, then one of the second translation binaries is checked. If that instruction is not addressable at a target there, another one of the second translation binaries is checked. The process continues until the instruction is found, which may be in the last of the second translation binaries (e.g., the one with all the instructions addressed). The dispatcher table 312 is then updated as described herein, and execution continues from the translation binary which had the marker corresponding to the target address of the indirect branch.

In this way, by having multiple second translation binaries, the compiler (e.g., compiler 404) optimizes some of the second translation binaries (e.g., fewer markers). This provides the runtime dispatcher 410 with a faster failover path with the second translation binaries.

Some examples contemplate machine emulation (e.g., CPU level emulation). However, other examples contemplate emulating one processing architecture on another processing architecture. For example, aspects of the disclosure enable applications written for the ANDROID brand operating system to be run on another processing architecture.

Alternatively or in addition to the other examples described herein, examples include any combination of the following:

execute, by a dispatcher via the dispatcher table stored in the memory area, a first translated binary;

upon encountering a branch instruction in the first translated binary to a target that is addressable in the first translated binary, execute the instruction in the first translated binary;

upon encountering an indirect branch instruction in the first translated binary that is not to a target addressable in the first translated binary, access the second translated binary, the second translated binary including one or more marker values corresponding to a second set of instructions to targets addressed in the source binary, wherein the processor is further programmed to execute the instruction in the second translated binary via the marker values;

wherein the first translated binary has one or more optimizations not present in the second translated binary;

wherein the processor is further programmed to, after executing the instruction via the marker values, update the dispatcher table with the target address of the indirect branch instruction based on the marker values;

wherein the source binary is configured to be executed by a source processing architecture, and wherein the first translated binary and the second translated binary are configured to be executed by the target processing architecture;

wherein the target processing architecture executes the instruction without generating executable machine code at runtime;

wherein the target processing architecture executes the instruction without just-in-time or runtime compilation;

wherein the processor is programmed to return to the first translated binary from the second translated binary after executing the target of the indirect branch instruction in the target processing architecture via the marker values;

wherein the processor is programmed to return to the first translated binary by branching directly to the dispatcher for every indirect or direct branch instruction that leaves the current function;

accessing, by a computing device, a source binary;

translating the source binary into a first translated binary having one or more optimizations, wherein translating includes identifying a subset of instructions in the source binary;

creating, by the computing device, a mapping between the subset of instructions in the source binary and corresponding instructions in the first translated binary;

generating a second translated binary which is a 1 to 1 translation of the source binary, from the source binary, that includes marker values corresponding to the all of the instructions in the source binary;

populating, by the computing device, a dispatcher table of the marker values, wherein a runtime dispatcher executes the first translated binary and the second translated binary to emulate the source binary;

wherein translating comprises recognizing a subset of instructions in the source binary and including first translated binary versions of the recognized subset of instructions in the first translated binary;

wherein creating the mapping comprises populating a hash table, and wherein populating the tables of the marker values comprises creating a lookup table;

wherein creating the lookup table comprises adding a target address of each translated instruction into the lookup table, wherein the lookup table is keyed by a corresponding offset in the source binary;

wherein creating the second translated binary comprises creating a plurality of second translated binaries each with progressively fewer compiler optimizations;

a compiler component that when executed causes at least one processor to generate a first translated binary and a second translated binary from a source binary, the first translated binary having one or more compiler optimizations not present in the second translated binary;

a runtime component that when executed causes at least one processor to execute the first translated binary and the second translated binary, generated by the compiler component, to emulate the source binary on a target processing architecture by accessing the second translated binary only upon encountering a branch instruction with a target that is not addressable in the first translated binary;

wherein the compiler component generates the first translated binary and the second translated binary by:
  accessing the source binary;
  translating the source binary into the first translated binary, wherein translating includes identifying a subset of instructions in the source binary;
  creating a mapping between the subset of instructions in the source binary and corresponding instructions in the first translated binary;
  generating the second translated binary, from the source binary, that includes marker values corresponding to all of the instructions in the source binary; and
  populating first and second tables of the marker values for the first and second translated binaries;

wherein the runtime component executes the first translated binary and the second translated binary by:
  executing a first translated binary by a dispatcher via a dispatcher table, the dispatcher table mapping a subset of instructions from a source binary to corresponding instructions in the first translated binary;
  upon encountering a branch instruction in the first translated binary with a target that is addressable in the first translated binary, executing the target in the first translated binary; and
  upon encountering a branch instruction in the first translated binary with a target that is not addressable in the first translated binary, accessing the second translated binary, the second translated binary including one or more marker values corresponding to all of the targets in the source binary, and further comprising executing the target in the second translated binary via the marker values;

wherein every address from the source binary is translated in the second translated binary;

wherein the runtime component executes without just-in-time compilation or other runtime interpretation;

wherein the runtime component executes to emulate a source processing architecture on a target processing architecture; and wherein the source binary represents a game configured to execute on a non-legacy gaming console that prohibits execution of dynamically generated machine code.

At least a portion of the functionality of the various elements in FIGS. 1-4 may be performed by other elements in FIGS. 1-4, or an entity (e.g., processor, web service, server, application program, computing device, etc.) not shown in FIGS. 1-4.

In some examples, the operations illustrated in FIGS. 5-6 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user 302 in any way, including from input devices such as a keyboard or pointing device, via gesture input, proximity input (such as by hovering), and/or via voice input.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other examples of the invention may include different computer-executable instructions or components having more or less functionality than illustrated and described herein.

Aspects of the invention transform a general-purpose computer into a special-purpose computing device when configured to execute the instructions described herein.

The examples illustrated and described herein as well as examples not specifically described herein but within the scope of aspects of the invention constitute exemplary means for processor emulation using multiple translations. For example, the elements illustrated in FIGS. 1-4, such as when encoded to perform the operations illustrated in FIG. 5 and/or FIG. 6, constitute exemplary means for executing, by a dispatcher via the dispatcher table stored in the memory area, the instruction in the first translated binary upon encountering a branch instruction in the first translated binary to a target that is addressable in the first translated binary, exemplary means for accessing the second translated binary upon encountering a branch instruction in the first translated binary that is to a target not addressable in the first translated binary, exemplary means for executing the target instructions in the first translated binary via the marker values, exemplary means for accessing, by a computing device, a source binary, exemplary means for translating the source binary into a first translated binary having one or more optimizations, wherein translating includes identifying a subset of instructions in the source binary, exemplary means for creating, by the computing device, a mapping between the subset of instructions in the source binary and corresponding instructions in the first translated binary, exemplary means for identifying all of the instructions in the source binary, exemplary means for generating a second translated binary, from the source binary, that includes one or more marker values corresponding to all of the target addresses of the instructions in the source binary, and exemplary means for populating, by the computing device, a first and second table of the marker values for the first and second translated binaries, wherein a runtime dispatcher executes the first translated binary and the second translated binary to emulate the source binary.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. One or more computer storage media embodying computer-executable components, the components comprising:

a compiler component that upon execution causes at least one processor to generate a first translated binary and a plurality of second translated binaries from a source binary, the first translated binary having one or more compiler optimizations not present in the plurality of second translated binaries, wherein the plurality of second translated binaries have different levels of compiler optimizations; and a runtime component that upon execution causes at least one processor to execute the first translated binary and one or more binaries of the plurality of second translated binaries, generated by the compiler component, to emulate the source binary on a target processing architecture by accessing one or more binaries of the plurality of second translated binaries only upon encountering a branch instruction in the first translated binary with a target that is not addressable in the target processing architecture, a dispatcher table being populated with target addresses from a marker table of the first translated binary at runtime, a target that is not addressable being a target in the source binary having no corresponding address entry in the dispatcher table, wherein at least one address from the source binary is translated in the plurality of second translated binaries and the runtime component upon execution causes the at least one processor to check the plurality of second translated binaries for the target that is not addressable by checking the plurality of second translated binaries in an order having progressively fewer compiler optimizations.

2. The computer storage media of claim 1, wherein the compiler component generates the first translated binary and one or more binaries of the plurality of second translated binaries by:

accessing the source binary;

translating the source binary into the first translated binary, wherein translating includes identifying a subset of instructions in the source binary; creating a mapping between the subset of instructions in the source binary and corresponding instructions in the first translated binary;

generating the one or more binaries of the plurality of second translated binaries, from the source binary, that includes one or more marker values corresponding to all of the instructions in the source binary; and populating the marker table with the marker values.

3. The computer storage media of claim 2, wherein the runtime component executes the first translated binary and the one or more binaries of the plurality of second translated binaries by:

executing the first translated binary by a dispatcher via the dispatcher table, the dispatcher table mapping the subset of instructions from the source binary to corresponding instructions in the first translated binary;

upon encountering a branch instruction in the first translated binary that is addressable in the first translated binary, executing the instruction in the first translated binary;

upon encountering a branch instruction in the first translated binary with a target that is not addressable in the first translated binary, accessing the one or more binaries of the plurality of second translated binaries, the one or more binaries of the plurality of second translated binaries including one or more marker values corresponding to all of the instructions in the source binary, and further comprising executing the instruction in one or more binaries of the plurality of second translated binaries via the marker values; and updating the dispatcher table upon identifying in one of the plurality of second translated binaries, an address for the target that was not addressable in the first translated binary.

4. The computer storage media of claim 1, wherein the runtime component executes without just-in-time compilation.

5. The computer storage media of claim 1, wherein the runtime component executes to emulate a source processing architecture on a target processing architecture.

6. A method comprising:

accessing, by a computing device, a source binary;

generating a first translated binary and a plurality of second translated binaries from the source binary, the first translated binary having one or more compiler optimizations not present in the plurality of second translated binaries, wherein the plurality of second translated binaries have different levels of compiler optimizations; and executing the first translated binary and one or more binaries of the plurality of second translated binaries to emulate the source binary on a target processing architecture by accessing one or more binaries of the plurality of second translated binaries only upon encountering a branch instruction in the first translated binary with a target that is not addressable in the target processing architecture, and populating a dispatcher table with target addresses from a marker table of the first translated binary at runtime, a target that is not addressable being a target in the source binary having no corresponding address entry in the dispatcher table, wherein at least one address from the source binary is translated in the plurality of second translated binaries and wherein the executing the first translated binary causes the computing device to check the plurality of second translated binaries for the target that is not addressable by checking the plurality of second translated binaries in an order having progressively fewer compiler optimizations.

7. The method of claim 6, wherein generating the first translated binary and the plurality of second translated binaries comprises:

translating the source binary into the first translated binary, wherein translating includes identifying a subset of instructions in the source binary;

creating a mapping between the subset of instructions in the source binary and corresponding instructions in the first translated binary;

generating the plurality of second translated binaries, from the source binary, that includes one or more marker values corresponding to all of the instructions in the source binary; and populating the marker table with the marker values.

8. The method of claim 7, wherein executing the first translated binary and the plurality of second translated binaries comprises:

executing the first translated binary by a dispatcher via the dispatcher table, the dispatcher table mapping the subset of instructions from the source binary to corresponding instructions in the first translated binary;

upon encountering a branch instruction in the first translated binary that is addressable in the first translated binary, executing the instruction in the first translated binary; and upon encountering a branch instruction in the first translated binary with a target that is not addressable in the first translated binary, accessing the plurality of second translated binaries, the plurality of second translated binaries including one or more marker values corresponding to all of the instructions in the source binary, and further comprising executing the instruction in the plurality of second translated binaries via the marker values.

9. The method of claim 6, wherein every address from the source binary is translated in the plurality of second translated binaries.

10. The method of claim 6, wherein the first translated binary and the plurality of second translated binaries at runtime are executed without just-in-time compilation.

11. The method of claim 6, further comprising executing to emulate a source processing architecture on a target processing architecture.

12. The method of claim 6, further comprising executing without runtime interpretation of the source binary.

13. A system comprising:

a memory area associated with a computing device in a target processing architecture, the memory area storing a dispatcher table; and a processor programmed to:

access a source binary;

generate a first translated binary and a plurality of second translated binaries from the source binary, the first translated binary having one or more compiler optimizations not present in the plurality of second translated binaries, wherein the plurality of second translated binaries have different levels of compiler optimizations; and execute the first translated binary and the one or more second translated binaries to emulate the source binary on a target processing architecture by accessing one or more binaries of the plurality of second translated binaries only upon encountering a branch instruction in the first translated binary with a target that is not addressable in the target processing architecture, and populating the dispatcher table with target addresses from a marker table of the first translated binary at runtime, a target that is not addressable being a target in the source binary having no corresponding address entry in the dispatcher table, wherein at least one address from the source binary is translated in the plurality of second translated binaries and wherein the processor is further programmed to check the plurality of second translated binaries for the target that is not addressable by checking the plurality of second translated binaries in an order having progressively fewer compiler optimizations.

14. The system of claim 13, wherein the processor is further programmed to generate the first translated binary and the plurality of second translated binaries by:
   translating the source binary into the first translated binary, wherein translating includes identifying a subset of instructions in the source binary;
   creating a mapping between the subset of instructions in the source binary and corresponding instructions in the first translated binary;
   generating the plurality of second translated binaries, from the source binary, that includes one or more marker values corresponding to all of the instructions in the source binary; and
   populating the marker table with the marker values.

15. The system of claim 14, wherein the processor is further programmed to execute the first translated binary and the plurality of second translated binaries by:
   executing the first translated binary by a dispatcher via the dispatcher table, the dispatcher table mapping the subset of instructions from the source binary to corresponding instructions in the first translated binary;
   upon encountering a branch instruction in the first translated binary that is addressable in the first translated binary, executing the instruction in the first translated binary; and
   upon encountering a branch instruction in the first translated binary with a target that is not addressable in the first translated binary, accessing the plurality of second translated binaries, the plurality of second translated binaries including one or more marker values corresponding to all of the instructions in the source binary, and further comprising executing the instruction in the plurality of second translated binaries via the marker values.

16. The system of claim 13, wherein every address from the source binary is translated in the plurality of second translated binaries.

17. The system of claim 13, wherein the first translated binary and the plurality of second translated binaries runtime are executed without just-in-time compilation.

18. The system of claim 13, wherein the processor is further programmed to execute to emulate a source processing architecture on a target processing architecture.

19. The system of claim 13, wherein the processor is further programmed to execute without runtime interpretation of the source binary.

* * * * *